(12) United States Patent
Lin

(10) Patent No.: US 9,846,301 B2
(45) Date of Patent: Dec. 19, 2017

(54) DUST COLLECTOR AND PROJECTION APPARATUS WITH SAME

(71) Applicant: DELTA ELECTRONICS, INC., Taoyuan Hsien (TW)

(72) Inventor: Bo-Song Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 239 days.

(21) Appl. No.: 14/828,782

(22) Filed: Aug. 18, 2015

(65) Prior Publication Data

US 2016/0236131 A1 Aug. 18, 2016

(30) Foreign Application Priority Data

Feb. 13, 2015 (TW) .............................. 104105123 A

(51) Int. Cl.
*G03B 21/16* (2006.01)
*H04N 9/31* (2006.01)
*B03C 3/47* (2006.01)
*G02B 27/00* (2006.01)
*B03C 3/011* (2006.01)
(Continued)

(52) U.S. Cl.
CPC .......... *G02B 27/0006* (2013.01); *B03C 3/011* (2013.01); *B03C 3/08* (2013.01); *B03C 3/12* (2013.01); *B03C 3/155* (2013.01); *B03C 3/368* (2013.01); *B03C 3/41* (2013.01); *B03C 3/47* (2013.01); *B03C 3/82* (2013.01); *G03B 21/16* (2013.01); *B03C 2201/24* (2013.01); *H04N 9/3144* (2013.01)

(58) Field of Classification Search
CPC ...... G03B 21/16; H04N 9/3144; B03C 3/368; B03C 3/38; B03C 3/41; B03C 3/47; B03C 3/08; B03C 3/12; B03C 3/82
USPC ............................ 353/55, 52, 57, 58, 60, 61
See application file for complete search history.

(56) References Cited

U.S. PATENT DOCUMENTS

2008/0307973 A1* 12/2008 Gale ........................ B03C 3/08
96/77
2010/0229724 A1* 9/2010 Tokuda .............. G01N 15/0656
96/19
(Continued)

FOREIGN PATENT DOCUMENTS

CN 2710019 7/2005
CN 102188871 9/2011
(Continued)

*Primary Examiner* — Ryan Howard
(74) *Attorney, Agent, or Firm* — Kirton McConkie; Evan R. Witt

(57) ABSTRACT

A dust collector includes a casing, a fan, a filtering element, an electric field generator and an electrostatic precipitator. The casing includes an inlet, an outlet and a channel. The channel is arranged between the inlet and the outlet. An ambient airflow is introduced into the channel through the inlet by the fan. Moreover, portions of suspended particles in the airflow are filtered off by the filtering element. The electric field generator generates an electric field. The suspended particles passing through the electric field generator have a first electrical polarity. The electrostatic precipitator has a second electrical polarity, wherein the first electrical polarity and the second electrical polarity are opposite. The suspended particles with the first electrical polarity are adsorbed by the electrostatic precipitator.

9 Claims, 5 Drawing Sheets

(51) Int. Cl.
*B03C 3/82* (2006.01)
*B03C 3/08* (2006.01)
*B03C 3/12* (2006.01)
*B03C 3/155* (2006.01)
*B03C 3/36* (2006.01)
*B03C 3/41* (2006.01)

(56) References Cited

U.S. PATENT DOCUMENTS

2011/0299043 A1* 12/2011 Nishihata ........... B01D 46/0065
                                                            353/52
2013/0156551 A1*  6/2013 Kanzawa ................. F04D 3/00
                                                           415/140
2013/0233172 A1*  9/2013 Genereux ................. B03C 3/45
                                                            96/58

FOREIGN PATENT DOCUMENTS

EP          0403230 A1 * 12/1990    ............. B03C 3/155
TW         201114453          5/2011

* cited by examiner

DUST COLLECTOR AND PROJECTION APPARATUS WITH SAME

FIELD OF THE INVENTION

The present invention relates to a dust collector, and more particularly to a dust collector having a filtering element and an electrostatic precipitator. The present invention also relates to a projection apparatus with the dust collector.

BACKGROUND OF THE INVENTION

Conventionally, the illumination systems used in most projection apparatuses are for example ultra-high pressure (UHP) mercury lamps. Recently, light emitting diodes (LED) and laser diodes are gradually used as the illumination systems of the projection apparatuses. While designing the illumination system, the color of the projection image and the use life are taken into consideration. Generally, the illumination system comprises a light source and a color wheel. During operation of the illumination system, a light source emits a single color beam to the color wheel and thus three primary color lights RGB are produced. In the conventional laser projection apparatus, the illumination system further comprises the color wheel and an additional phosphor wheel. When a laser light source emits a laser beam to excite a phosphor powder of the phosphor wheel, a color light with a different wavelength is produced. Consequently, the three primary color lights RGB can be produced. However, the heat dissipation mechanism of the illumination system of the laser projection apparatus is an important factor influencing the use life of the illumination system. Conventionally, the heat dissipation mechanism introduces a cooling gas into the illumination system in order to remove the heat from the illumination system. However, while the cool airflow is inhaled into the illumination system, external dust is readily introduced into the internal portion of the illumination system along with the airflow. Under this circumstance, the performance of the phosphor wheel is deteriorated, and thus the use life of the illumination system reduces.

For preventing the contamination of the particulate dust, the illumination system is usually equipped with a filter for filtering the particulate dust of the airflow. Moreover, the filtered particulate dust is collected by a dust bag. As known, the pore size of the filter is an important factor. In case that the pore size of the filter is too large, the filter is unable to effectively retain the dust. Whereas, in case that the pore size of the filter is too small, the flow rate of the airflow is largely reduced. Under this circumstance, the heat cannot be effectively removed by the airflow. Moreover, since the filter is usually installed within the illumination system, the user cannot visually realize whether the accumulated dust of the filter is serious and whether the filter needs to be replaced. If the accumulated dust of the filter is serious and the filter is not replaced with a new one, the dust collecting efficiency of the filter is impaired and the heat dissipating efficiency is deteriorated.

Nowadays, an infrared detecting technology is used to detect whether the dust collecting level of the dust bag reaches a preset level. However, as the dust collecting level of the dust bag increases, the dust bag is subjected to irregular deformation. The infrared detecting technology detects whether an optical path of an infrared ray is obstructed by the expanded volume of the dust bag so as to judge whether the dust collecting level of the dust bag reaches the preset level. Owing to the irregular deformation of the dust bag, the infrared detecting technology may have a misjudgment problem. Moreover, since the filter and the dust bag are fixed within the projection apparatus, the user cannot replace the filter and the dust bag. In other words, for replacing the filter or the dust bag, the user has to send the projection apparatus to the manufacturer or the maintenance center.

SUMMARY OF THE INVENTION

An object of the present invention provides a dust collector and a projection apparatus with the dust collector. Firstly, portions of the suspended particles in the airflow are filtered off by a filtering element. Then, the other portions of the suspended particles are removed by an electric field generator and an electrostatic precipitator according to electrostatic attraction. Consequently, the efficacy of collecting and removing the dust can be achieved.

Another object of the present invention provides a dust collector and a projection apparatus with the dust collector. By sensing a capacitance value of an electrostatic precipitator, the dust collecting level of the electrostatic precipitator can be realized. If the dust collecting level of the electrostatic precipitator reaches a preset level, a warning signal is generated to warn the user to replace the components of the dust collector.

A further object of the present invention provides a dust collector and a projection apparatus with the dust collector. The components of the dust collectors are modularized designs. Consequently, these components can be assembled or disassembled in a swappable manner. In other words, the dust collector of the present invention can be maintained more easily.

In accordance with an aspect of the present invention, there is provided a dust collector. The dust collector includes a casing, a fan, a filtering element, an electric field generator and an electrostatic precipitator. The casing includes an inlet, an outlet and a channel. The channel is arranged between the inlet and the outlet. The fan is installed in the casing and disposed within the channel. An ambient airflow is introduced into the channel through the inlet by the fan. The filtering element is installed in the casing and disposed within the channel. Moreover, portions of suspended particles in the airflow are filtered off by the filtering element. The electric field generator is installed in the casing and disposed within the channel. The electric field generator is arranged beside the filtering element and generates an electric field. The suspended particles passing through the electric field generator have a first electrical polarity. The electrostatic precipitator is installed in the casing and disposed within the channel. The electrostatic precipitator is arranged beside the electric field generator and has a second electrical polarity, wherein the first electrical polarity and the second electrical polarity are opposite. The suspended particles with the first electrical polarity are adsorbed by the electrostatic precipitator.

In accordance with another aspect of the present invention, there is provided a projection apparatus. The projection apparatus includes an illumination system and a dust collector. The dust collector includes a casing, a fan, a filtering element, an electric field generator and an electrostatic precipitator. The casing includes an inlet, an outlet and a channel. The channel is arranged between the inlet and the outlet. The fan is installed in the casing and disposed within the channel. An ambient airflow is introduced into the channel through the inlet by the fan. The filtering element is installed in the casing and disposed within the channel.

Moreover, portions of suspended particles in the airflow are filtered off by the filtering element. The electric field generator is installed in the casing and disposed within the channel. The electric field generator is arranged beside the filtering element and generates an electric field. The suspended particles passing through the electric field generator have a first electrical polarity. The electrostatic precipitator is installed in the casing and disposed within the channel. The electrostatic precipitator is arranged beside the electric field generator and has a second electrical polarity, wherein the first electrical polarity and the second electrical polarity are opposite. The suspended particles with the first electrical polarity are adsorbed by the electrostatic precipitator. Moreover, the airflow passing through the electrostatic precipitator is directed to the illumination system to remove heat of the illumination system.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
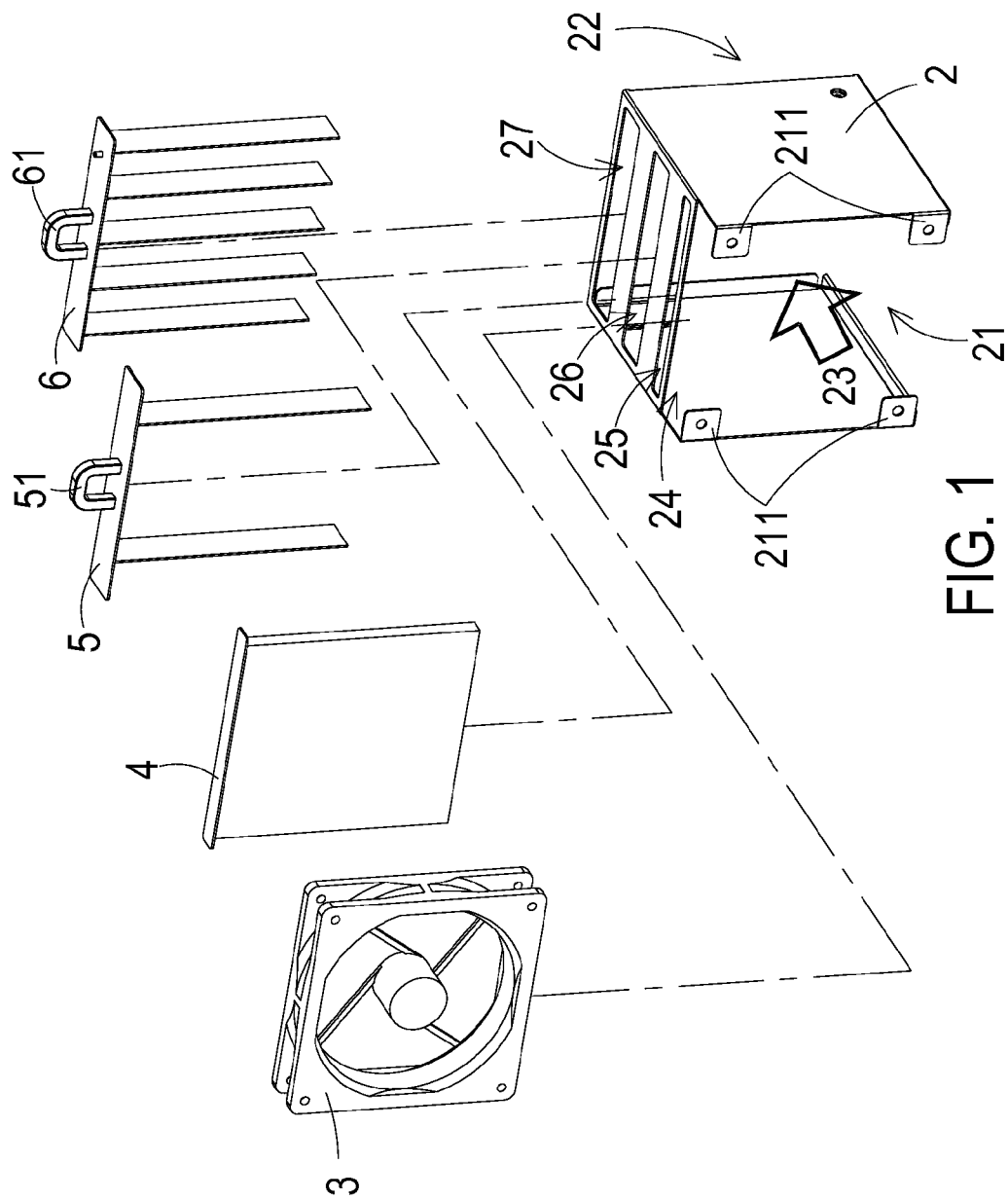
FIG. 1 is a schematic exploded view illustrating a dust collector according to an embodiment of the present invention.
Figure 2:
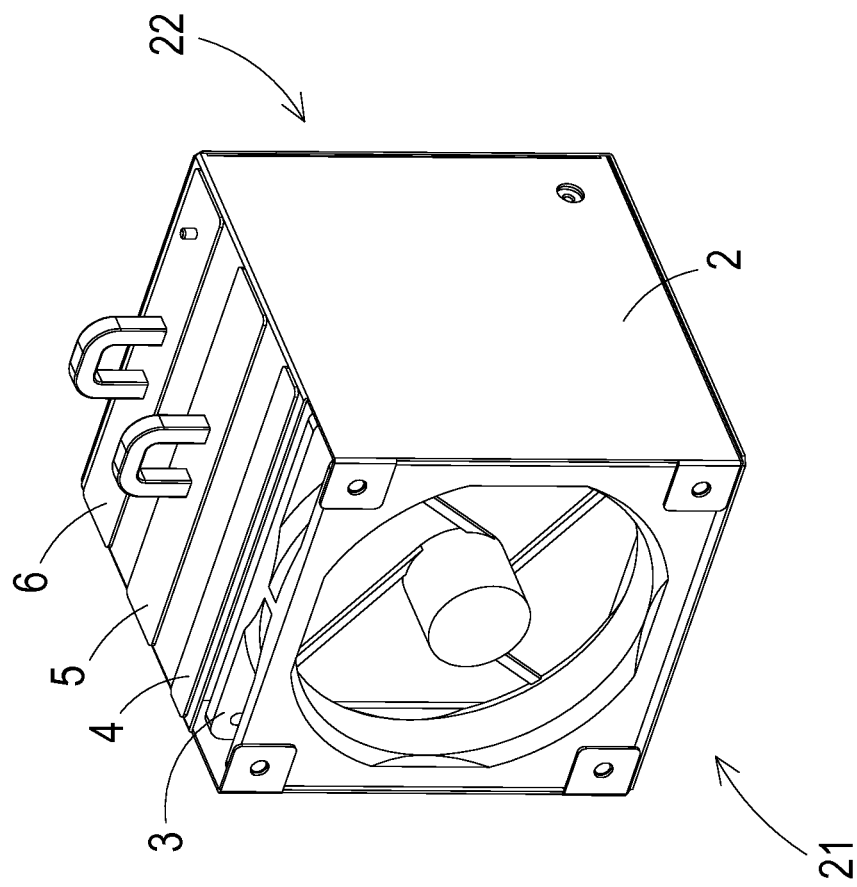
FIG. 2 is a schematic assembled view illustrating the dust collector of FIG. 1.

FIG. 1 is a schematic exploded view illustrating a dust collector according to an embodiment of the present invention. FIG. 2 is a schematic assembled view illustrating the dust collector of FIG. 1. As shown in FIGS. 1 and 2, the dust collector 1 comprises a casing 2, a fan 3, a filtering element 4, an electric field generator 5 and an electrostatic precipitator 6.

The casing 2 comprises an inlet 21, an outlet 22, a channel 23, a first insertion slot 24, a second insertion slot 25, a third insertion slot 26 and a fourth insertion slot 27. The casing 2 further comprises plural fastening parts 211. The plural fastening parts 211 are arranged beside the inlet 21. The channel 23 is arranged between the inlet 21 and the outlet 22. The ambient airflow can be introduced into the channel 23 through the inlet 21 and outputted from the outlet 22. The first insertion slot 24, the second insertion slot 25, the third insertion slot 26 and the fourth insertion slot 27 are sequentially arranged along the direction from the inlet 21 to the outlet 22.

The fan 3 is inserted into the first insertion slot 24 of the casing 2 and accommodated within the channel 23 of the casing 2. The fan 3 is aligned with the inlet 21. After plural fastening elements (not shown) are penetrated through the corresponding fastening parts 211 and tightened into corresponding fixing holes of a first surface of the fan 3, the fan 3 is fixed on the casing 2. Consequently, during operations of the fan 3, the vibration of the fan 3 is largely reduced and the fan 3 is not detached from the casing 2. In this embodiment, the fan 3 is configured to inhale the ambient airflow into the channel 23 through the inlet 21 and eject the heated airflow to the surroundings through the outlet 22.

The filtering element 4 is inserted into the second insertion slot 25 of the casing 2 and accommodated within the channel 23 of the casing 2. A first surface of the filtering element 4 is arranged beside a second surface of the fan 3. The filtering element 4 is used for filtering off portions of the suspended particles in the airflow that is inhaled by the fan 3. An example of the filtering element 4 includes but is not limited to a dust filter.

The electric field generator 5 is inserted into the third insertion slot 26 of the casing 2 and accommodated within the channel 23 of the casing 2. A first surface of the electric field generator 5 is arranged beside a second surface of the filtering element 4. When an external voltage (not shown) is applied to the electric field generator 5, the electric field generator 5 generates an electric field. Due to the electric field, the portions of the suspended particles of the airflow passing through the filtering element 4 have a first electrical polarity X. In this embodiment, the electric field generator 5 has an inverted U-shaped structure.

The electrostatic precipitator 6 is inserted into the third fourth insertion slot 27 of the casing 2 and accommodated within the channel 23 of the casing 2. A first surface of the electrostatic precipitator 6 is arranged beside a second surface of the electric field generator 5. A second surface of the electrostatic precipitator 6 is arranged beside the outlet 22. When an external voltage (not shown) is applied to the electrostatic precipitator 6, electrostatic precipitator 6 has a second electrical polarity Y, wherein the first electrical polarity X and second electrical polarity Y are opposite. The portions of the suspended particles of the airflow having the first electrical polarity X and passing through the electric field generator 5 are adsorbed by the electrostatic precipitator 6.

Preferably but not exclusively, the fan 3, the filtering element 4, the electric field generator 5 and/or the electrostatic precipitator 6 are modularized designs. Consequently, these components can be assembled or disassembled in a swappable manner. In some embodiments, the electric field generator 5 comprises a handle 51, and the electrostatic precipitator 6 comprises a handle 61. By grasping the handle 51 or 61, the electric field generator 5 or the electrostatic precipitator 6 can be assembled or dissembled easily. Preferably, the electrostatic precipitator 6 comprises plural elongated plates. Moreover, the electric field generator 5 and the electrostatic precipitator 6 are made of conductive material (e.g. metallic material).

The operations of the dust collector 1 will be illustrated with reference to FIGS. 1 and 2. When the fan 3 is activated, the ambient airflow is inhaled into the channel 23 through the inlet 21 by the fan 3. Then, portions of the suspended particles in the airflow are filtered off by the filtering element 4, and the other portions of the suspended particles pass through the filtering element 4. In particular, the large-sized suspended particles are retained by the filtering element 4, and the small-sized suspended particles pass through the filtering element 4. That is, the particles smaller than the pore size of the filtering element 4 can pass through the filtering element 4. Then, the suspended particles passing through the filtering element 4 are directed to the electric field generator 5. Due to the electric field of the electric field generator 5, the suspended particles have the first electrical polarity X. Then, the suspended particles having the first electrical polarity X are directed to the electrostatic precipitator 6. Since the electrostatic precipitator 6 has the second electrical polarity Y opposite to the first electrical polarity X, the suspended particles having the first electrical polarity X are adsorbed by the electrostatic precipitator 6 according to electrostatic attraction. Consequently, the dust collector 1 has the function of collecting and removing the dust.

From the above descriptions, portions of the suspended particles in the airflow are firstly filtered off by the filtering element 4, and then the other portions of the suspended particles are removed by the electric field generator 5 and the electrostatic precipitator 6 according to electrostatic attraction. Consequently, the efficacy of collecting and removing the dust can be achieved.

Figure 3:
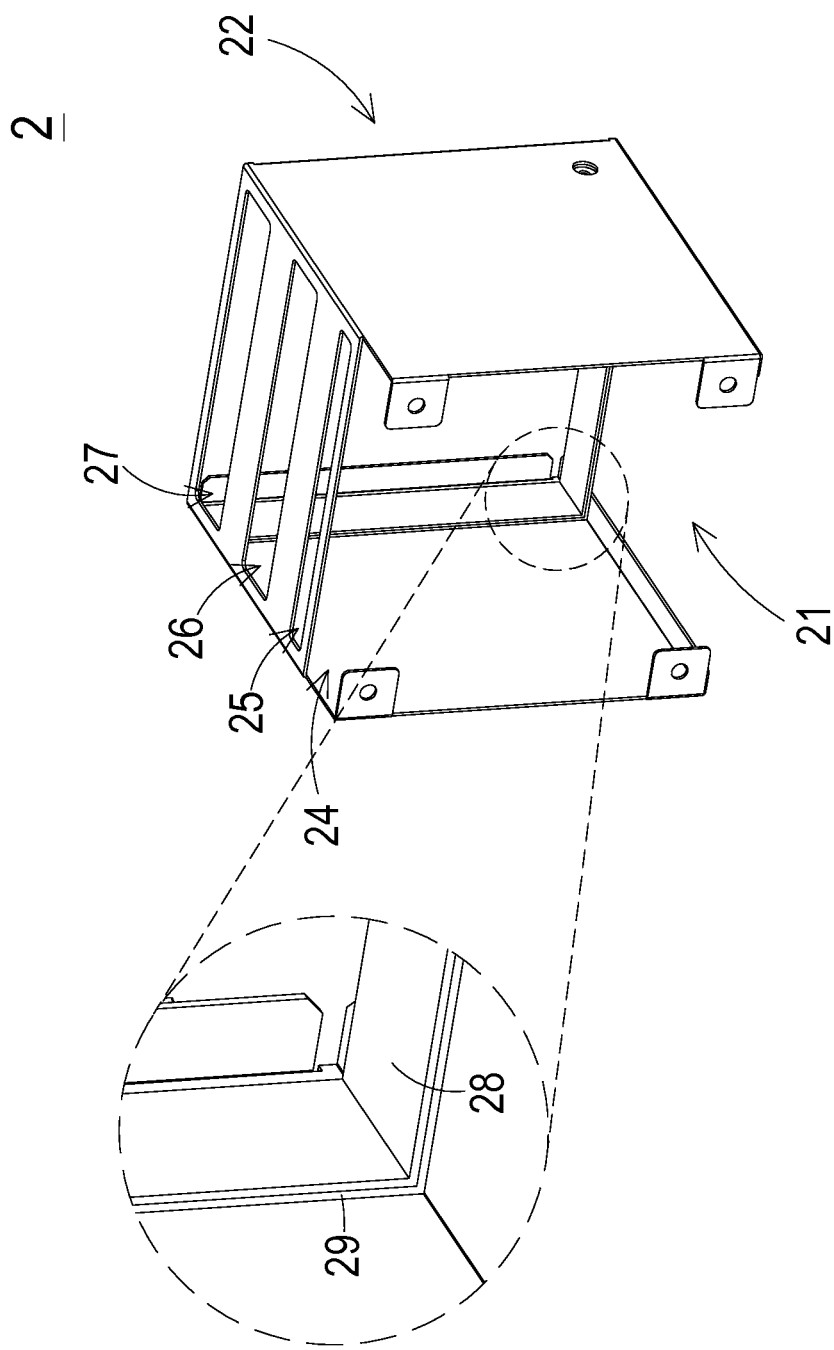
FIG. 3 is a schematic perspective view illustrating a portion of a casing of a dust collector according to an embodiment of the present invention.
Figure 4:
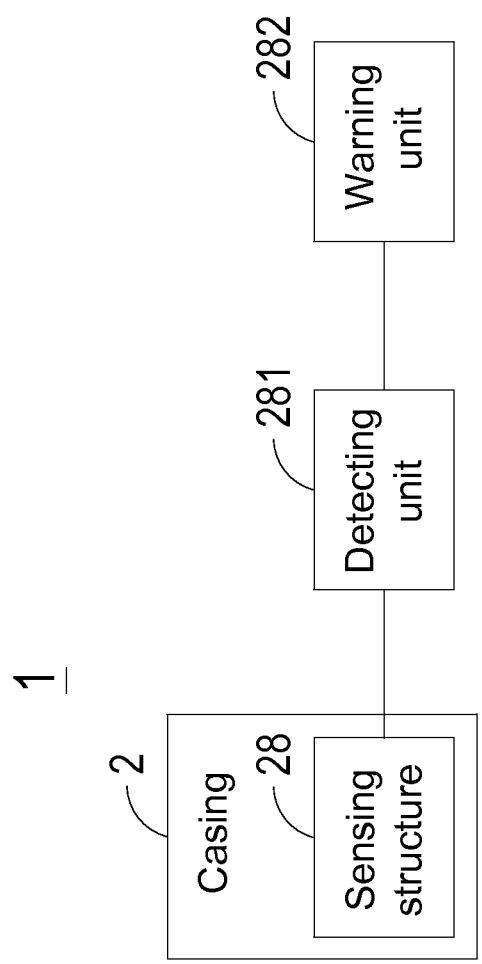
FIG. 4 is a schematic functional block diagram illustrating a portion of the dust collector of FIG. 3.

FIG. 3 is a schematic perspective view illustrating a portion of a casing of a dust collector according to an embodiment of the present invention. FIG. 4 is a schematic functional block diagram illustrating a portion of the dust collector of FIG. 3. In this embodiment, the dust collector 1 further comprises a sensing structure 28 and an insulation structure 29. The sensing structure 28 is disposed within the casing 2 and isolated from the electrostatic precipitator 6. In particular, the sensing structure 28 is disposed within the fourth insertion slot 27 of the casing 2 and arranged around the electrostatic precipitator 6. Preferably, the width of the sensing structure 28 is substantially equal to the width of the electrostatic precipitator 6. The insulation structure 29 is arranged between the casing 2 and the sensing structure 28 for isolating the sensing structure 28 from the casing 2. In some embodiments, the dust collector 1 further comprises a detecting unit 281 and a warning unit 282. The detecting unit 281 and the warning unit 282 are located outside the casing 2. Moreover, the sensing structure 28 is electrically connected with the detecting unit 281, and the detecting unit 281 is electrically connected with the warning unit 282. In some embodiments, there is an allowable difference (e.g., 5%) between the width of the electrostatic precipitator 6 and the width of the sensing structure 28. That is, the width of the electrostatic precipitator 6 is slightly larger the width of the sensing structure 28, or the width of the electrostatic precipitator 6 is slightly smaller than the width of the sensing structure 28. An example of the detecting unit 281 includes but is not limited to a detector IC. An example of the warning unit 282 includes but is not limited to an indication lamp or a buzzer. Preferably but not exclusively, the sensing structure 28 is made of conductive material (e.g., metallic material), and the insulation structure 29 is made of insulation material (e.g., rubbery material or plastic material). In this embodiment, the sensing structure 2 is configured to sense a sensing signal corresponding to a capacitance value of the electrostatic precipitator 6. The sensing signal is transmitted to the detecting unit 281. In case that the amount of the particles adsorbed by the electrostatic precipitator 6 increases, the capacitance value of the electrostatic precipitator 6 sensed by the sensing structure 28 correspondingly increases. In an embodiment, a capacitance threshold is stored in the detecting unit 281. If the capacitance value of the electrostatic precipitator 6 is larger than the capacitance threshold, the detecting unit 281 judges that a dust collecting level of the electrostatic precipitator 6 reaches a preset level.

Meanwhile, the detecting unit 281 issues a triggering signal to the warning unit 282. In response to the triggering signal from the detecting unit 281, the warning unit 282 issues a warning signal to warn the user to replace the components of the dust collector 1. Consequently, the dust collecting efficiency of the dust collector 1 is enhanced.

Figure 5:
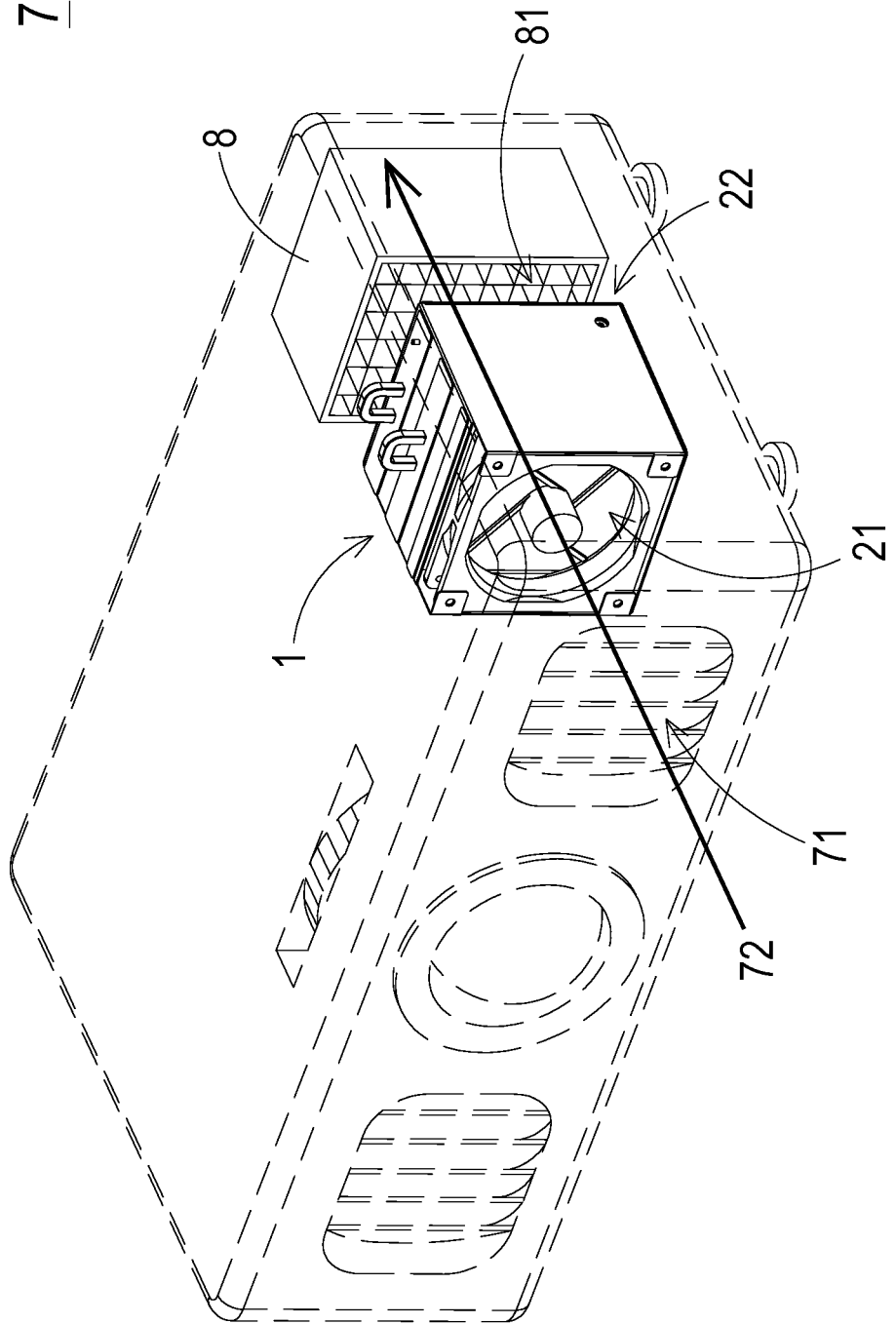
FIG. 5 is a schematic perspective view illustrating a projection apparatus with the dust collector of the present invention.

FIG. 5 is a schematic perspective view illustrating a projection apparatus with the dust collector of the present invention. Component parts and elements corresponding to those of FIG. 1 are designated by identical numeral references, and detailed descriptions thereof are omitted. As shown in FIG. 5, the projection apparatus 7 comprises an airflow input port 71 and an airflow path 72. Moreover, the projection apparatus 7 comprises an illumination system 8 and a dust collector 1. The airflow input port 71 is located at an end of the airflow path 72. The illumination system 8 and the dust collector 1 are located in the airflow path 72. The illumination system 8 comprises an airflow input port 81. The airflow input port 81 is arranged beside the outlet 22 of the dust collector 1. The inlet 21 of the dust collector 1 is arranged beside the airflow input port 71 of the projection apparatus 7. During operation of the projection apparatus 7, the airflow is introduced into the dust collector 1 through the airflow input port 71 of the projection apparatus 7 and the inlet 21 of the dust collector 1 sequentially. After the airflow is introduced into the dust collector 1, the dust (or suspended particles) in the airflow is collected by the dust collector 1. Then, the clean airflow is outputted from the outlet 22 of the dust collector 1 to the airflow input port 81 of the illumination system 8. Consequently, the heat of the illumination system 8 is removed to the surroundings by the clean airflow. Since the airflow to remove the heat of the illumination system 8 is clean, the inner components of the illumination system 8 are not contaminated by the dust. Under this circumstance, the use life of the illumination system 8 is enhanced.

From the above descriptions, the present invention provides the dust collector and the projection apparatus with the dust collector. Firstly, portions of the suspended particles in the airflow are filtered off by the filtering element. Then, the other portions of the suspended particles are removed by the electric field generator and the electrostatic precipitator according to electrostatic attraction. Consequently, the efficacy of collecting and removing the dust can be achieved. Moreover, by sensing the capacitance value of the electrostatic precipitator, the dust collecting level of the electrostatic precipitator can be realized. If the dust collecting level of the electrostatic precipitator reaches a preset level, a warning signal is generated to warn the user to replace the components of the dust collector. Moreover, the fan, the filtering element, the electric field generator and/or the electrostatic precipitator are modularized designs. Consequently, these components can be assembled or disassembled in a swappable manner. In other words, the dust collector of the present invention can be maintained more easily.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dust collector, comprising:
   a casing comprising an inlet, an outlet and a channel, wherein the channel is arranged between the inlet and the outlet;
   a fan installed in the casing and disposed within the channel, wherein an ambient airflow is introduced into the channel through the inlet by the fan;
   a filtering element installed in the casing and disposed within the channel, wherein portions of suspended particles in the airflow are filtered off by the filtering element;
   an electric field generator installed in the casing and disposed within the channel, wherein the electric field generator is arranged beside the filtering element and generates an electric field, wherein the suspended particles passing through the electric field generator have a first electrical polarity;
   an electrostatic precipitator installed in the casing and disposed within the channel, wherein the electrostatic precipitator is arranged beside the electric field generator and has a second electrical polarity, wherein the first electrical polarity and the second electrical polarity are opposite, wherein the suspended particles with the first electrical polarity are adsorbed by the electrostatic precipitator; and
   a sensing structure, wherein the sensing structure is disposed within the casing and isolated from the electrostatic precipitator, wherein the sensing structure is aligned with the electrostatic precipitator, and a capacitance value of the electrostatic precipitator is sensed by the sensing structure.

2. The dust collector according to claim 1, wherein the fan, the filtering element, the electric field generator or the electrostatic precipitator are modularized units, wherein the casing comprises a first insertion slot, a second insertion slot, a third insertion slot and a fourth insertion slot, wherein the fan, the filtering element, the electric field generator and the electrostatic precipitator are inserted into the first insertion slot, the second insertion slot, the third insertion slot and the fourth insertion slot, respectively.

3. The dust collector according to claim 1, further comprising an insulation structure, wherein the insulation structure is arranged between the casing and the sensing structure.

4. The dust collector according to claim 1, further comprising a detecting unit, wherein the detecting unit is electrically connected with the sensing structure, wherein according to the capacitance value of the electrostatic precipitator, the detecting unit judges whether a dust collecting level of the electrostatic precipitator reaches a preset level.

5. The dust collector according to claim 4, further comprising a warning unit, wherein the warning unit is electrically connected with the detecting unit, and the warning unit issues a warning signal in response to a triggering signal from the detecting unit.

6. The dust collector according to claim 1, wherein the sensing structure is made of metallic material.

7. The dust collector according to claim 1, wherein the casing further comprises plural fastening parts beside the inlet, and the fan is arranged beside the filtering element, wherein after plural fastening elements are penetrated through the corresponding fastening parts and tightened into corresponding fixing holes of the fan, the fan is fixed on the casing.

8. The dust collector according to claim 1, wherein the electric field generator and the electrostatic precipitator are made of metallic material.

9. A projection apparatus, comprising:
   an illumination system; and
   a dust collector comprising:
      a casing comprising an inlet, an outlet and a channel, wherein the channel is arranged between the inlet and the outlet;
      a fan installed in the casing and disposed within the channel, wherein an ambient airflow is introduced into the channel through the inlet by the fan;
      a filtering element installed in the casing and disposed within the channel, wherein portions of suspended particles in the airflow are filtered off by the filtering element;
      an electric field generator installed in the casing and disposed within the channel, wherein the electric field generator is arranged beside the filtering element and generates an electric field, wherein the suspended particles passing through the electric field generator have a first electrical polarity;
      an electrostatic precipitator installed in the casing and disposed within the channel, wherein the electrostatic precipitator is arranged beside the electric field generator and has a second electrical polarity, wherein the first electrical polarity and the second electrical polarity are opposite, wherein the suspended particles with the first electrical polarity are adsorbed by the electrostatic precipitator; and
      a sensing structure, wherein the sensing structure is disposed within the casing and isolated from the electrostatic precipitator, wherein the sensing structure is aligned with the electrostatic precipitator, and a capacitance value of the electrostatic precipitator is sensed by the sensing structure,
   wherein the airflow passing through the electrostatic precipitator is directed to the illumination system to remove heat of the illumination system.

* * * * *